United States Patent Office 3,554,943
Patented Jan. 12, 1971

3,554,943
EPOXY RESIN INK FOR PRINTING ON SUBSTRATES SUCH AS GLASS
John E. Dereich, Pittsburgh, Pa., assignor to Neville Chemical Company, Pittsburgh, Pa., a corporation of Pennsylvania
No Drawing. Original application Oct. 5, 1964, Ser. No. 401,724, now Patent No. 3,386,848, dated June 4, 1968. Divided and this application Feb. 15, 1968, Ser. No. 718,290
Int. Cl. C08g 30/12, 51/34
U.S. Cl. 260—18  3 Claims

ABSTRACT OF THE DISCLOSURE

An initially fusible printing composition suitable for printing on substrates such as glass bottles which comprises a normally solid epoxy resin, a solid fluxing agent, a dicarboxylic acid anhydride such as hexahydrophthalic anhydride as a hardener and a tin salt of a monocarboxylic acid such as stannous oleate as a cure accelerator. The composition can be applied or printed as a hot melt which solidifies immediately after contact with the cool substrate to form a dry, adherent film and which thereafter can be cured to an infusible form at a more elevated temperature than that used in the printing stage.

---

This is a division of application Ser. No. 401,724, filed Oct. 5, 1964, now U.S. Pat. 3,386,848.

This invention relates to an improvement in thermosetting epoxy resin compositions having a long pot life at an elevated temperature, and especially to the use of such compositions in forming plastic imprints, designs or coatings on the surface of solid objects, e.g., containers for beverages, for purposes such as decoration of the objects or identification of the container contents. More particularly, the invention relates to an improvement in applying ink-like compositions directly to the surface of glass bottles or similar articles, and to certain novel latent curing resin compositions useful for this and other purposes.

Glass bottles are commonly labeled or decorated by the use of colored glass frit which comprises fine particles of suitably tinted lead glass mixed or coated with a small amount of a thermoplastic binder such as a hydrocarbon resin or wax or a blend thereof. In one such known operation the wax-containing glass frit is heated to form a liquid ink of desired viscosity and applied by a screen printing technique to the bottles to be labeled. The thin film of hot ink thus applied to a cool bottle rapidly solidifies facilitating prompt transfer of the freshly labeled bottle to the next stage of the process without undue risk of smudging the labels. Next the bottle is slowly heated in an oven to burn out the organic binder from the imprint, the temperature eventually being raised up to about 1,200° F. to melt and fuse the imprinted glass frit to the main glass portion of the original bottle. Excellent printed labels are produced in this manner but such bottles are becoming less and less competitive with plastic containers on which labels can be printed far more readily than on glass. The main disadvantage of using printing compositions based on glass frit in the labeling of glass bottles is due to the high temperature at which the imprinted glass frit must be fused to the glass bottle and which requires subsequent re-annealing of the labeled bottle. This is an expensive operation because it requires a process cycle of many hours, resulting in relative inefficient utilization of expensive equipment.

It is an object of the present invention to provide a technique for printing labels on glass bottles which is similar to the old technique and based on the use of glass frit but which does not require fusing or curing the fresh imprint at unduly high temperature and therefore does not require any time consuming re-annealing of the labeled bottles. Another object is to provide a thermosetting coating composition which has a long pot life at a practical working temperature and cures readily at a more elevated temperature, e.g., a composition which can be substituted for glass frit in the conventional bottle labeling process with a minimum of process changes, retaining the important advantages of glass frit while permitting fixation of the imprinted labels at temperatures substantially below glass fusion temperature. Another object is to provide a high-speed process for printing labels on glass employing an essentially organic thermoplastic labeling composition which is solid at room temperature and thus may be supplied to the process in the form of a powder similar in physical appearance to the previously used glass frit compositions. More specifically, therefore, it is among the objects of this invention to provide a thermosetting, nonsagging coating or labeling composition which is solid at room temperature, which is liquid at temperatures in the range between about 160° and 200° F. and can be kept at such temperatures over extended periods without any substantial change in viscosity or color, which readily forms a solid, non-smudging film when imprinted on a cool solid substrate, and which can be rapidly cured to form a hard, adherent, heat and solvent resistant film by heating the coated substrate to a temperature above 200° F. but below the temperature at which the substrate melts or undergoes some other undesirable change.

With these objects in mind a new printing composition has been discovered (a) which is a solid at room temperature and is capable of being ground to a fine powder; (b) which melts at a temperature between about 130° to 200° F. to form a liquid which retains an essentially constant viscosity of between about 3,000 and 10,000 centipoises when maintained over periods of several hours or even days at a given temperature in this stated range, a viscosity in the range between about 5,000 and 50,000 centipoises, and most particularly between about 5,000 and 15,000 centipoises at 200° F. being preferred; (c) which is suitable for application to glass by known screen printing techniques; (d) which rapidly dries to a non-smudging consistency when applied as a molten liquid and thereafter cooled; and (e) which cures and crosslinks rapidly and without sagging or undesirable flowing to form heat fusible coating when heated to a temperature between about 350° and 500° F., e.g., between 350° and 450° F. for about 1 to 30 minutes, thereby producing on the glass a heat and solvent resistant label or design. Unlike resinous printing compositions previously tried for this general purpose, the present printing composition is supplied to the process in the form of a normally dry solid powder, without use of any volatile solvent.

In comparison with the normally liquid resinous printing compositions or solutions of the prior art, the normally solid composition of the present invention has the advantage that, while being applied in hot liquid form, it promptly solidifies after being imprinted on the cool glass substrate and immediately becomes non-smudging. Unlike glass frit, when heated for curing it tends to be self-repairing in that any pinholes that may have formed in the printing stop tend to close up. Further, unlike the solvent containing or otherwise reactive liquid compositions suggested in the prior art, the present normally solid composition has the advantage that it is easy to mix with desired solid pigments and easy to meter as a powder, maintains an essentially constant consistency when melted and kept at the proper temperature, and does not dry out on the printing screen due to loss of solvent or premature curing reaction. Unlike related prior art compositions, the composition of the present invention consists essentially of organic ingredients which are solid at room temperature, e.g., at temperatures up to about 100° or 120° F., and which form a stable liquid melt when heated in air to a temperature between about 135° and 200° F. In addition to the principal solid organic ingredients, the composition may of course contain varying amounts, e.g., 0.5 to 50%, but preferably not more than about 10%, of the conventional non-reactive, normally solid ink ingredients such as pigments. Particularly useful among these are titanium dioxide, copper phthalocyanine (Monastral Blue), monoazo dyestuffs such as Victoria Maroon, iron oxide reds, chrome green, chrome yellow, suitably tinted glass frit, etc. Small amounts of known viscosity stabilizers such as silica may also be included.

A particularly effective composition can be formulated by mixing (1) 100 parts of an epoxy resin having an epoxide equivalent between about 140 and 4,000, preferably between about 150 and 2,500, and most preferably between about 400 and 1,025, and a softening or melting point between about 150° and 170° F., e.g., Shell "Epon 1001"; (2) about 15 to 30 parts, preferably 20 to 25 parts, of a normally solid alkanol or aliphatic hydroxyl compound of at least 18 carbon atoms per molecule and having a melting point in approximately the same 150°–170° F. temperature range, e.g., octadecyl alcohol; (3) about 3 to 25 parts, preferably about 4 to 23 parts, of one of the polycarboxylic acid anhydrides which are known as active organic hardeners for epoxy resins and which also have a melting point in the aforesaid temperature range, particularly hexahydrophthalic anhydride ("HHPA"), the amount of acid anhydride preferably being such as to provide less than the stoichiometric amount of carboxyl groups with reference to the epoxide groups of the epoxy resin, e.g., between about 0.10 and 0.28 carboxyl groups per epoxide group of the epoxy resin present (or preferably about 10 to 30 parts of HHPA per 100 parts of an epoxy resin having an epoxide equivalent of about 500), as well as (4) a small catalytic amount, e.g., 0.1 to 5 parts, preferably 0.2 to 3.5 parts, of a tin salt of a higher monocarboxylic acid. Tin oleate is a particularly preferred catalyst because it is relatively inactive in this formulation at temperatures up to about 200° F. and quite active at substantially higher temperatures.

Small amounts of still other compounds such as 10 to 20 parts of epoxidized linseed oil or a similar plasticizer, which are commonly used in the coating art in conjunction with epoxy resins, may also be included in the composition of the present invention if and to the extent that they contribute some desirable property such as flexbility and do not interfere with the essential characteristics described earlier herein. Usually, however, the use of such additional ingredients is not required. The optimum proportions of the several ingredients vary somewhat within the aforementioned ranges depending on the specific ingredients used and process conditions to be met, as well as on the final film properties desired, but can be readily determined by preliminary empirical testing. It should be understood that though one of the minor constituents of the composition, such as the tin oleate catalyst, may be a liquid this should not affect the essentially dry solid character of the resin composition at ordinary room temperature as the concentration of any such liquid constituent is kept low.

With reference to the proportion of the acid anhydride hardener included in the composition, it should be kept in mind that even if the amount of anyhdride present is theoretically capable of supplying the stoichiometric quantity of carboxyl group per epoxide group of the epoxy resin, a composition compounded in accordance with the teachings of the present invention is characterized by an actual stoichiometric deficiency of carboxyl groups per epoxide group because the alcohol also reacts and consumes some of the anhydride. Indeed, while the invention should not be construed as being limited by any particular theory, a possible explanation for the surprisingly long pot life of the novel resin compositions is that at temperatures up to about 200° F., and especially in the presence of the tin catalyst or accelerator, the anhydride reacts preferentially with the hydroxyl groups of the alcohol to form an ester rather than reacting with the epoxide groups of the epoxy resin in a curing reaction. The formation of such an intermediate reaction product can be responsible for the long thermoplastic time or "B" stage of the novel composition in that the formation of the intermediate prevents the composition from curing until it is further heated to an appropriately higher temperature at which the intermediate breaks and the activated anhydride compound then reacts readily with and effectively cross-links and cures the epoxy resin. This suggested mechanism is consistent with the observation of no appreciable weght loss of the resin during the curing cycle and may explain why the cured resin is water-white in contrast to its opaque appearance when the clear hot melt is allowed to solidify prior to curing.

The ingredients may be conventionally mixed in the solid state by grinding in a ball mill or by blending them in powder form. It is also possible to prepare the novel compositions by heating the ingredients together to a temperature sufficient to melt them, e.g., 150° to 200° F., preferably withholding the tin catalyst until near the end of the melting step, stirring the resulting hot liquid at this temperature until a homogeneous mixture is formed, cooling the mixture, and then crushing and grinding it to reduce it to a fine particle size.

The high melting alkanol acts as a flux and extends the pot life of the formulation when melted, as well as contributing to its hardness when cold, without such a flux the formulation is tacky at room temperature when melted and subsequently cooled, as well as having an impractically short pot life due to being unduly reactive even at relative moderate temperatures. Hexahydrophthalic anhydride has been found to be greatly superior to all other hardeners tested but chlorendic anhydride and other similar normally solid carboxylic acid anhydrides which give printing compositions melting in the desired range may also be used.

Instead of tin oleate other tin soaps such as tin octoate may also be used but the tin oleate has been found to produce a composition with an unusually long pot life, e.g., 3 to 4 days at 160° F., and is therefore greatly preferred.

The epoxy resins useful in the present invention are well known commercial products obtained by condensing a polyhydric phenol such as 2,2-bis(p-hydroxyphenyl)-propane with an excess of a 1,2-epoxy-3-halohydrin such as epichlorohydrin so as to provide a solid resin having a softening point in the aforementioned temperature range.

Other polyhydric phenols or bisphenols useful in the preparation of suitable epoxy resins include bis(p-hydroxyphenyl)methane as well as trihydric phenols such as 3,4-di-(p-hydroxybenzyl)phenol. The resins which may be used in this invention have a 1,2-epoxy equivalency greater than 1.0, i.e., the average number of 1,2-epoxy groups contained in the average molecule of the resinous reaction product is greater than 1, or, put differently, the resin contains an epoxide equivalent in the range between about 140 and 1,025, preferably between about 425 and 550. By "the epoxide equivalent," reference is made to the grams of the polymeric resin containing 1 gram equivalent of epoxide. An excess of epichlorohydrin is generally used in producing the desired, normally solid resins. The epoxy resins themselves, as well as various methods for their preparation are well known and are described, for instance, in U.S. Patents Nos. 2,765,288; 2,965,610 and 3,062,771 among many others.

One such commercially available resin ("Epon 1001") which is an epichlorohydrin/bisphenol-A type solid epoxy resin and which is typical of resins suitable for use herein had the properties summarized in Table I.

TABLE I

Specifications for typical epoxy resin

Melting point [1]—150°–165° F.
Color 77° F. (Gardner) [2]—4 max.
Viscosity [3], 77° F.—1.0–1.7 poises (D-Co Gardner-Holt)
Epoxide equivalent [4]—475–525
Avg. molecular weight—900
Equivalent weight (g. resin to esterify one mole of acid)—145
Hydroxyl content equiv. OH/100 g. resin—0.28
Bulk density of flaked material—35–40 lb./cu. ft.
Weight per gallon 68° F. (void-free)—9.9 lb.

[1] Durrans' Mercury Method, SMS 114.
[2] ASTM D 1544–585; 40% solution in butyl carbitol.
[3] Bubble-Tube Method (ASTM D–154); solution in butyl carbitol.
[4] Grams of resin containing one gram equivalent of epoxide.

The printing process of the present invention can be carried out on equipment now used in printing labels or decorative designs on glass by the conventional glass frit process. For instance, in carrying out the novel process the novel resinous labeling composition, after being heated to a temperature above its melting point, may be applied to glass by spraying through a stencil or, preferably, by a printing process of the silk screen type. In such a process the desired pattern, label or design is cut in a cloth-like stainless steel mesh screen and the molten labeling composition is then squeegeed through such a screen directly onto a bottle or other glass object which is brought in contact with the screen. The metal screen, being an electrical resistor, can be conveniently maintained at the desired temperature, e.g., 180° F., by passing electric current of appropriate intensity through it.

At the point of use, on the screen, the labeling composition desirably has a viscosity of about 5,000 to 50,000 cps., i.e., it has a consistency such that it does not readily pass through the design cut in the screen except when it is positively forced through it by means of a squeegee or flexible wiper blade passing over the screen. The labeling composition itself can either be supplied on top of the screen in powdered form and melted there or it can be supplied to the screen in hot liquid form from an adjacent reservoir which is maintained at an appropriate temperature.

As soon as the glass bottle is imprinted and rolls away or is withdrawn from the printing stage it is substantially dry to the touch and can be passed to the next stage, e.g., a baking oven, or to intermediate storage, and otherwise handled in the uncured state without risk of smearing the fresh imprint.

The bottles bearing the imprinted label are finally passed to a baking oven where they are heated at a temperature between about 400° and about 500° F. for about 5 to about 20 minutes, preferably less than 20 minutes, cooled in air and are then immediately ready for use. Excellent high gloss labels resistant to immersion in water, dilute alkali solutions, detergent solutions and organic solvents such as acetone are thus produced in a very effective and economical way.

EXAMPLES

The invention is further illustrated by the several blends which were prepared from the ingredients summarized in Table II below.

In preparing these blends all of the indicated materials except the tin salts were in the form of solid powders or flakes. Each blend was prepared by mixing the solids in the stated proportions, heating the resulting mixture to 200° F. until the mixture melted and became uniform while stirring, and then stirring the tin salt in at about this temperature with rapid stirring. Each formulation was then poured into an aluminum boat and allowed to cool. All of the formulations were clear and essentially water-white liquids when molten but, excepting blend 5, because of apparent heterogeneity became opaque dry thermoplastic solids when cooled to room temperature. Blend 5, which lacked the alcohol, appeared to give a homogeneous product which upon cooling remained clear but became sticky rather than hardening to a dry solid. When maintained in molten form at 200° F. blends 1–4 and 6 are stable without any noticeable increase in viscosity for a period of at least eight hours. Blend 6 remained unchanged when maintained at 200° F. for three days. Blends 1–4 began to thicken and cure after periods ranging from eight to about twelve hours at 200° F. Tin octoate, which was used as the catalyst in blends 1–4, is a more active curing catalyst at the holding temperature of 200° F. than tin oleate, which was used in blend 6. However, in spite of its relatively low activity here at 200° F., tin oleate is an excellent catalyst at baking temperatures such as 400° F. and is therefore particularly useful in the present invention.

TABLE II

| Blend No. | 1 | 2 | 3 | 4 | 5 | 6 |
|---|---|---|---|---|---|---|
| "Epon 1001" epoxy resin (solid) | 150 | 150 | 150 | 150 | 150 | 150 |
| Octadecyl alcohol | 34 | 34 | 34 | 34 | | 37.5 |
| HHPA[1] | 34 | 17 | 34 | 34 | 150 | 10.0 |
| "Epoxy 9-5" epoxidized linseed oil | 17 | 17 | 34 | | | |
| Tin salt | [2] 4.5 | [2] 4.5 | [2] 4.5 | [2] 4.5 | | [3] 0.5 |
| Cured film properties | (G)(F)(H) | (G)(F)(H) | (G)(F)(ST) | (G)(VH) | Tacky | (G)(H) |

[1] HHPA=hexahydrophthalic anhydride.
[2] Tin salt=tin octoate.
[3] Tin salt=tin oleate.
NOTE:
NOTE: G=Glossy.
F=Flexible.
H=Hard.
VH=Very hard.
ST=Slightly tacky.

In a separate series of tests each of the six blends was melted at 200° F., each in a separate fused silica dish with just enough resin to form a thin film. After a few minutes at 200° F. the dishes were heated to 400° F. and held at this temperature for ten minutes. Blends 1, 2, 3, 4 and 6 cured to form excellent infusible, adherent resin films. Blend 5, which contained neither catalyst nor octadecyl alcohol, did not cure in this baking test and required about one hour or more at 400° F. to harden.

As illustrated by blends 1–3, the presence of epoxidized linseed oil in concentrations of up to about 20%, e.g., about 5 to 12%, based on the epoxy resin can be used as a plasticizer to make the cured film more flexible. However, when flexibility is unimportant, as in the case of imprints applied to a rigid glass surface, the epoxidized linseed oil may be completely omitted. At high concentrations the plasticizer tends to produce an undesirably sticky film as illustrated by blend 3.

Blend 6 has been found to be particularly suitable for imprinting decorative or descriptive labels on glass bottles by the conventional metal screen printing process, but blends 1, 2 and 4 have also given very good results.

Many fluxing agents such as cetyl alcohol, benzophenone, adipic acid, citric acid, diphenyl phthalate and trimethylolpropane have been tried in place of octadecyl alcohol but, due to their too ready compatibility or insufficient reactivity or due to a combination of such factors, have not been found effective in extending the pot life or in giving a tack-free film in the uncured state prior to baking. Only the higher molecular weight solid polyethylene glycols, e.g., materials having a molecular weight between about 4,000 and 20,000, and the monomethyl ethers of such glycols have shown promise and may be useful as a flux in place of octadecyl alcohol when only a moderately long pot life is required.

While the invention has been described herein with particular reference to an improvement in the printing on glass art, the novel compositions are of course of value in many other fields where it is advantageous to use a latent curing resin having a long pot life or thermoplastic time at some intermediate temperature and capable of being cured at a higher temperature. For example, the novel compositions can be used to bind pre-impregnated glass roving, cloth, fiber or mat which can be thermoset at any later time by subjecting it to a higher temperature. The modified epoxy resin system of this invention likewise offers important advantages where the short pot life of a conventional epoxy system limits the working time of the formulation, as where a part is impregnated, vacuum treated to remove air bubles at a temperature high enough to allow a fluid resin and then must be formed before the resin gels.

Furthermore, the long pot life of the novel compositions at 200° F. allows a fluid that can be easily spread over the desired area of wooden, metal, ceramic or glass part or substrate for use as an adhesive without use of any volatile solvents, and then cured by any suitable method such as induction heating, resistance heating, oven baking, and the like. This allows parts to be coated with a non-sticky film which is a latent adhesive, to be joined at a later date to another part or at a different stage or place of manufacture. In a similar fashion, the composition can be applied to a substrate to serve as a permanent protective or decorative coating thereon. The novel compositions also are especially useful in the application of coatings by the fluidized bed techniques wherein the coating resin formulation requires good flow characteristics during the coating step, final cure being obtained by subsequent baking or heating as described. The substrate to which the resinous composition of this invention can be applied may be any solid material which is substantially non-reactive and capable of being heated to a temperature of at least about 330° F. for a sufficient length of time to effect the desired cure of the coating without causing any undesirable change in the substrate itself.

It will be understood that amounts and proportions of materials are expressed in this application on a weight basis unless otherwise indicated.

The foregoing description of the invention and of the manner and processes of making and using it, including examples illustrative of the best mode of carrying it out, will enable persons skilled in the art to make and use the described invention as well as its variations and modifications which fall within its scope and spirit. The subject matter which is regarded as the invention is particularly pointed out in the appended claims.

What is claimed is:

1. A thermosetting resin composition having a melting point between about 130° and 200° F. and a viscosity of between about 3,000 and 50,000 cps. at 200° F., which is composed essentially of:
    (a) 100 parts of a normally solid, fusible epoxy resin which melts at a temperature between about 125° and 200° F., and which has an epoxide equivalent of between about 140 and 4,000;
    (b) 15 to 30 parts of octadecyl alcohol;
    (c) 3 to 25 parts of an anhydride selected from the group consisting of hexahydrophthalic anhydride and chlorendic anhydride and which is present in the composition in a proportion sufficient to provide about 0.1 to less than 0.3 carboxyl group per epoxy group of the epoxy resin present; and
    (d) 0.1 to 5 parts of a tin salt of a monocarboxylic acid which is soluble in said composition.

2. A thermosetting resin composition according to claim 1 which further comprises about 10 to 20 parts of epoxidized linseed oil.

3. A printing composition suitable for screen printing on glass, which is composed essentially of 100 parts of a normally solid, fusible epoxy resin which melts at a temperature between about 125° and 200° F. and which has an epoxide equivalent of between about 400 and 1,025, 20 to 30 parts of octadecyl alcohol, 5 to 10 parts of hexahydrophthalic anhydride and 0.2 to 1 part of tin oleate.

References Cited

UNITED STATES PATENTS

| 3,427,255 | 2/1969 | Case | 260—78.4X |
| 3,386,848 | 6/1968 | Dereich | 260—18X |
| 3,299,008 | 1/1967 | Mueller | 260—78.4X |
| 3,201,360 | 8/1965 | Proops et al. | 260—18 |
| 2,947,712 | 8/1960 | Belanger et al. | 260—18 |

DONALD E. CZAJA, Primary Examiner

C. WARREN IVY, Assistant Examiner

U.S. Cl. X.R.

260—30.4, 31.8, 32.8, 33.4, 37, 47